June 4, 1963    M. A. McDERMOTT    3,092,302
STORAGE CONTAINER
Filed April 4, 1961    2 Sheets-Sheet 1
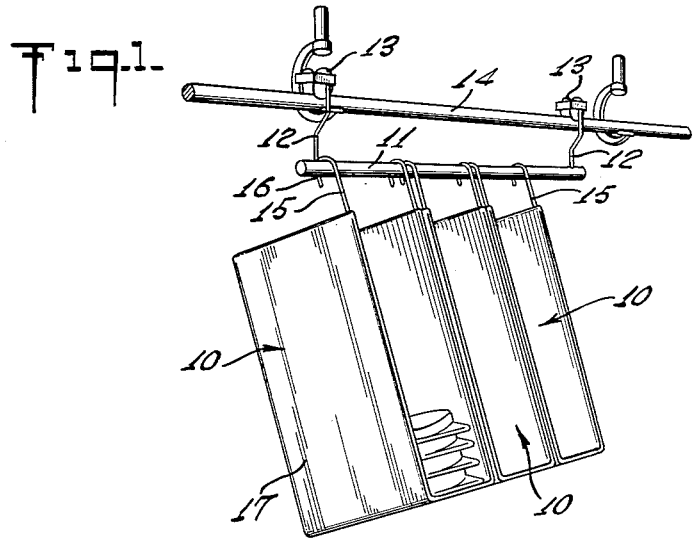
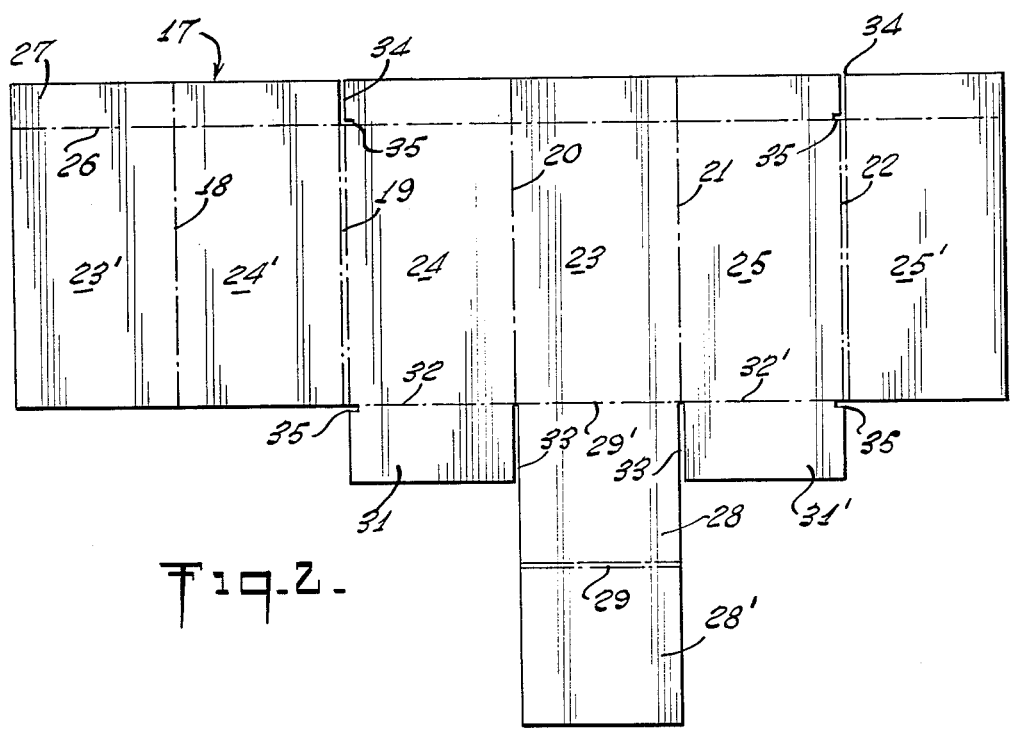
INVENTOR
MARTIN A. McDERMOTT
BY
Burgess, Ryan, & Hicks
ATTORNEYS June 4, 1963 M. A. McDERMOTT 3,092,302
STORAGE CONTAINER
Filed April 4, 1961 2 Sheets-Sheet 2
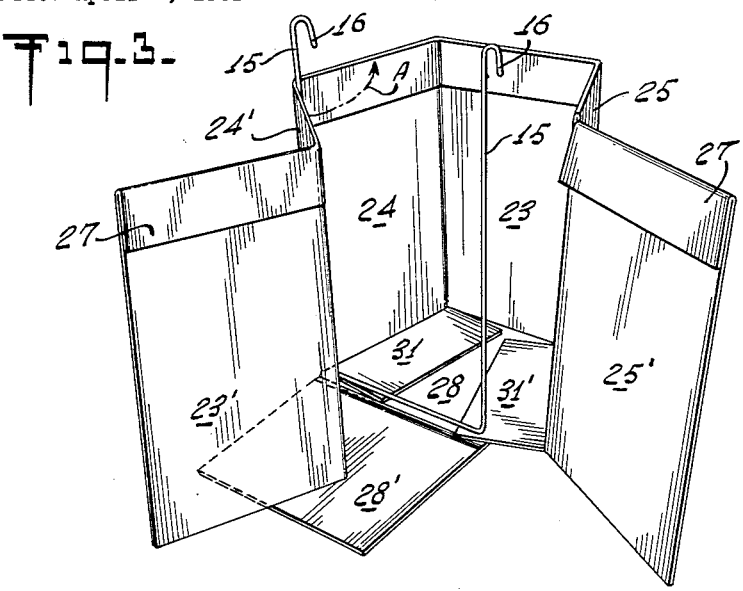
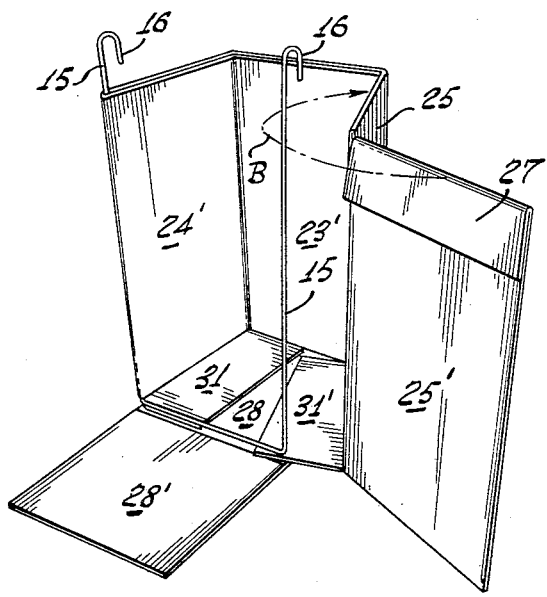
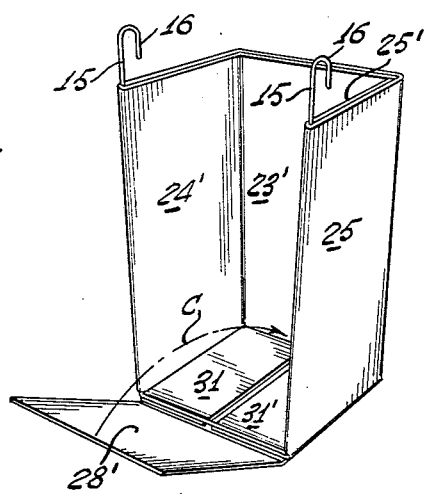
INVENTOR
MARTIN A. McDERMOTT

3,092,302
STORAGE CONTAINER
Martin A. McDermott, 3501 Farragut Road, Brooklyn, N.Y.
Filed Apr. 4, 1961, Ser. No. 100,693
4 Claims. (Cl. 229—52)

The present invention relates to an improved inventory storage container and relates, more particularly, to a collapsible container for the storage of inventory in an accessible and transportable manner.

An object of the present invention is to provide a container for the storage of inventory which is simple and inexpensive to construct. Another object of the invention is to provide an inventory storage container which can be shipped or stored in a flat condition and which can be quickly erected for use without tools or the like.

A further object of the present invention is to provide a collapsible inventory storage container which is strong and sturdy and which does not require fastening means to maintain it in erected condition.

Other objects and advantages of the invention will be apparent and best understood from the following description and the accompanying drawings, in which:

FIG. 1 is a perspective view of a set of inventory storage containers embodying the present invention illustrating the manner in which such containers are used in conjunction with a mono-rail system;

FIG. 2 is a plan view of a blank in flat condition which when erected forms the body of the containers shown in FIG. 1; and FIGS. 3, 4, and 5 are perspective views illustrating different stages in the erection and assembly of the storage containers shown in FIG. 1.

Inventory storage containers embodying the present invention are particularly designed for use in conjunction with an inventory storage system of the type shown and described in United States Letters Patent No. 2,922,567 for Inventory Storage Container which issued to me on January 26, 1960, and reference may be made to said patent for further details concerning such a system.

Referring to the drawings in detail and in particular to FIG. 1, there is a series of three storage containers 10 embodying the present invention which are supported in side by side relation from a horizontal rod or bar 11. The ends of the bar 11 are connected by brackets 12 to wheels 13 which run on a mono-rail track 14 so that the rod together with storage containers suspended therefrom may be moved as desired to various areas served by a storage system of which the mono-rail forms a part.

Each of the storage containers 10 includes a body which is open at its front and top and has a bottom with spaced side walls and a back or rear wall extending upwardly therefrom. The opening in the front of the container permits items of merchandise to be placed in or removed from the container without difficulty and it also permits the number of items stored in each container to be readily checked by visual inspection. The containers are provided with hangers 15 which have portions extending beyond the top edges of the side walls at the front corners thereof. The hangers have hooks at their upper ends which engage with the horizontal support bar and support the container in a rearwardly tilted position with the open fronts thereof facing upwardly as shown in FIG. 1.

The body of each container may be formed from a single sheet or blank 17 of corrugated paper board or similar material, such as the blank shown in FIG. 2. In order to permit the container body to be readily erected by folding operations, the blank is provided with score or fold lines 18, 19, 20, 21, and 22 which extend vertically across the width of the blank and define a pair of rear panels 23, 23', a pair of side panels 24, 24', and a second pair of side panels 25 and 25'. These panels are disposed relative to each other in such a way that when the container body is erected (see FIGS. 3–5), the rear panels 23 and 23' are superimposed on each other and form the rear wall of the container; the first pair of side panels 24 and 24' are superimposed on each other and form one side wall of the container; and the second pair of side panels 25 and 25' are likewise superimposed on each other and form the other side wall of the container. In order to reinforce the top of the container, a fold line 26 which is spaced below and extends parallel to the top edge of the blank may be provided to define a fold 27 at the top of each panel which folds inwardly and is located between each pair of superimposed panels when the container is erected. With such a fold, the top edge of the container is formed by four thicknesses of the corrugated board which lend rigidity and strength to the container at this point.

In addition to the panels forming the rear and side walls, the blank includes a pair of bottom panels 28, 28'. One of the bottom panels is connected to the lower edge of one of the rear panels along a fold line 29 and to the other bottom panel along a fold line 29' in such a way that the bottom panels are superimposed on each other to form the bottom of the container when the container is erected. In addition, bottom flaps 31 and 31' are connected along fold lines 32 and 32' to the lower edges of the side panels 24 and 25 adjacent the rear panel to which one of the bottom panels is connected. The support flaps are separated by slots 33 from the sides of the bottom panel 28, and, as shown in FIGS. 3–5, the bottom flaps are interposed between the superimposed panels forming the bottom when the container is erected.

The fold at the top of the blank also contains slots 34 which extend across the fold at the forward ends of the side panels 24 and 25, and notches 35 to receive and hold the hanger in place may be provided at the inner ends of these slots 34 and in the outer sides of the bottom flaps at the point where they join the side panels.

The hanger 16 comprises a U-shaped frame which may be made of wire or other suitable material and extends around the sides and bottom of the front opening of the container. When the blank is folded to form the container body, one leg of the U is enclosed within the fold at the front edge of each set of superimposed panels forming the side walls and the bottom of the U is enclosed within the fold at the front edges of the superimposed panels forming the bottom. When the hanger is incorporated in the container structure in this manner, it supports the front of the container bottom and holds the front edges of the side walls in place.

As mentioned previously, the legs of the hanger extend beyond the container body at the front corners of each of the side walls and are provided with rearwardly facing hooks at their ends which engage with the support rod of the mono-rail system.

Briefly, storage container as described above comprises a body formed from a flat sheet of material and which has a rear wall, a pair of side walls and a bottom of double thickness. A U-shaped hanger which is enclosed within folds at the front edges of the side walls and the bottom of the container, defines an opening in the front of the container and holds the bottom and side walls of the container in place. The legs of the hanger which extend beyond the top of the container body at the front edge of each side wall, have hooks to engage with a support from which the container is suspended in a rearwardly tilted position.

The assembly of the container is illustrated in FIGS. 3–5. As shown in FIG. 3, the blank is set up with the side and rear panels extending upwardly and with the top edge folded over. The hanger located in the opening in the front of the container has one leg extending along the fold line between one pair of the side panels so that when the blank is folded as indicated by the arrow A, the leg of the hanger will be enclosed within this fold. The other pair of side panels are then folded around the other leg of the hanger and into superimposed relation as indicated by the arrow B in FIG. 4. The bottom panels are then folded over the bottom of the hanger and into superimposed relation as indicated by the arrow C in FIG. 5. It will be understood that this exact sequence of steps need not be followed. In this connection, it should be noted that it is desirable to cut the blank so that the free edges thereof will abut against an opposing panel and frictionally engage therewith when the container is assembled.

A storage container constructed in this manner is extremely strong and sturdy. It maintains its shape and can be erected or knocked down very quickly without the use of tools or fastening devices.

It will be understood that various changes and modifications may be made in the embodiment of the invention illustrated and described herein without departing from the scope of the invention as defined by the following claims.

I claim:

1. A storage container formed from a sheet of foldable material which comprises a body having side walls, a rear wall and a bottom which are joined together as part of a sheet and which define an opening in the front of the body, said side walls, rear wall and bottom each being formed of a double thickness of the sheet, said side walls and bottom containing folds located at the front opening of the body, and a U-shaped hanger located within said folds and extending around the bottom and sides of the front opening of the body.

2. A storage container as defined in claim 1 wherein the U-shaped hanger has leg portions extending beyond the top of the container body at the front edges of the side walls and said legs have hooks formed at their ends.

3. A storage container as defined in claim 1 wherein the container body includes a fold extending along the top edges of the side and rear walls of the container, said fold being located between the thicknesses of the sheet forming the side and rear walls of the body and reinforcing the top edges thereof.

4. An inventory storage and shipment container which comprises a body having an opening at the front thereof, said body being formed of sheet material folded to form spaced side walls and a rear wall, said side walls having folds along their forward edges, a U-shaped wire frame extending along opposite sides and across the bottom of the opening at the front of the body, said frame including spaced leg portions located within the folds at the forward edges of the side walls of the body and a bottom member extending between said leg portions at the lower ends of the side walls, said leg portions extending lengthwise of the side walls along the forward edges thereof and maintaining said side walls in spaced relation, support engaging members connected to said leg portions and extending beyond the side walls at the upper ends thereof and a bottom extending between the side walls at their lower ends, said bottom extending rearwardly to the rear wall and being supported at its forward end by the bottom member of the U-shaped frame.

References Cited in the file of this patent

UNITED STATES PATENTS

| | | |
|---|---|---|
| 1,245,479 | Lundy | Nov. 6, 1917 |
| 1,942,771 | Phillips | Jan. 9, 1934 |
| 2,612,306 | Frankenstein | Sept. 30, 1952 |
| 2,791,365 | Cohen | May 7, 1957 |
| 2,922,567 | McDermott | Jan. 26, 1960 |